WILLIAM C. WILLEY.
Improvement in Seed-Droppers.
No. 126,001.  Fig. 1.  Patented April 23, 1872.
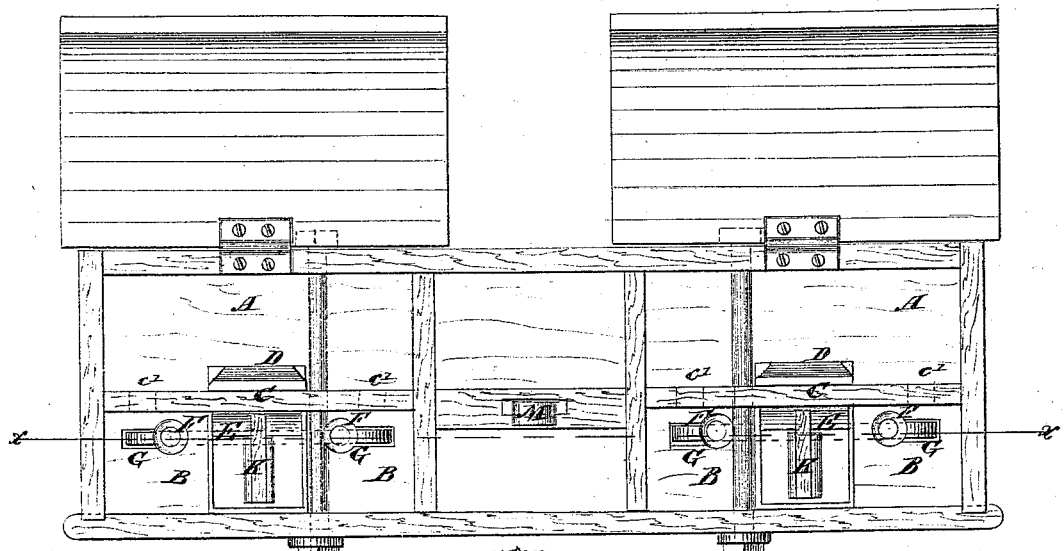
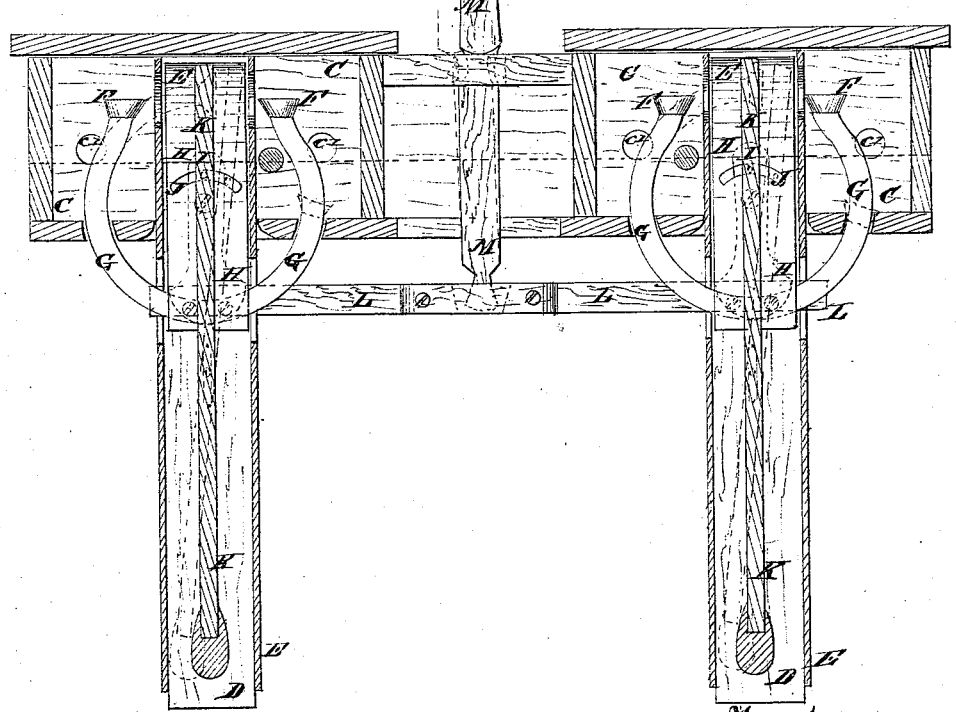
Witnesses:
P. C. Dieterich.
Francis McArdle.
Inventor:
Wm. C. Willey
PER. Munn & Co.
Attorneys.

UNITED STATES PATENT OFFICE.

WILLIAM C. WILLEY, OF LIMERICK, ILLINOIS, ASSIGNOR TO HIMSELF AND J. H. ELLIS, OF SAME PLACE.

IMPROVEMENT IN SEED-DROPPERS.

Specification forming part of Letters Patent No. 126,001, dated April 23, 1872.

Specification describing certain Improvements in Seed-Droppers, invented by WILLIAM C. WILLEY, of Limerick, in the county of Bureau and State of Illinois.

Figure 1 is a top view of my improved device. Fig. 2 is a detail vertical section of the same taken through the line $x\ x$, Fig. 1.

Similar letters of reference indicate corresponding parts.

My invention has for its object to furnish an improved seed-dropping device, which shall be so constructed and arranged that it may be attached to any ordinary planter, and which shall at the same time be simple in construction, easily and conveniently operated, and reliable and accurate in operation; and it consists in the construction and arrangement of the various parts of the device, as hereinafter more fully described.

A is the seed-reservoir, which is separated from the seed-chamber B by the partition C. The seed-chamber B is made deeper than the reservoir A, and receives seed from the reservoir A through holes $c'$ in the partition C at the bottom of the seed-reservoir A, so that the seed may always stand at about the same depth in the chamber B as long as there is any seed in the reservoir A. To the box A B C is securely attached the upper ends of the standards D, to the lower ends of which furrowing-plows may be attached, when desired, and along the rear sides of which pass the spouts E that conduct the seed to the ground. The upper ends of the spouts pass up into the seed-chambers B, and terminate at or near the top of said seed-chambers. In the opposite sides of the upper parts of the spouts E are formed holes to receive the seed-cups F, which are formed upon or attached to the ends of the curved bars G. The cups F should be of such a size as to contain seed enough to form a hill. The cups F should be screwed to the ends of the bars G, so that, by turning them off or on, their internal capacity may be adjusted as required. The arms of the curved bars G pass up through holes in the bottom of the seed-chambers B, and their middle parts are secured to the lower part of the arm or segment H, which is pivoted to the rear side of the upper part of the standards D; and to their upper ends are attached pins I, which project through slots J in the forward sides of the spouts E, and enter the edge of the partition K, which extends down through the spouts E, and is pivoted to the middle part of said spouts. The lower ends of the partitions K may be enlarged or thickened to receive the seed and prevent it from being crushed between them and the sides of the spouts. To the lower parts of the arms or segments H are pivoted the ends of the bar L, which has a hole or socket formed in its middle part to receive the lower end of the lever M, which passes through a keeper or mortise attached to or formed in a bar at the upper part of the center of the seed-hoppers A B C, and which mortise or keeper serves as a fulcrum to said lever.

By this construction, as the lever M is operated the bar L oscillates the arms H, causing the curved bars G to raise their ends, alternately discharging the seed from the cups F into the spouts E. As the cup at one end of the bar G rises, the same movement of the arm H moves the upper end of the partition K away from the side of the spout E at which the said cup F is rising, and moves the lower end of the said partition K toward the said side, so as to receive the seed and hold it until the next movement of the said partition allows it to drop to the ground.

Having thus described my invention, I claim as new and desire to secure by Letters Patent—

The vibrating lever M, bar L, arms H, cupped bars F G, chamber B, and valved rod K, all constructed and arranged as described, in combination with chambers A A, as and for the purpose set forth.

WM. C. WILLEY.

Witnesses:
  GEO. B. JONES,
  SAML. M. OAKFORD.